March 18, 1924. Re. 15,797

E. R. DRAVER

TRANSMISSION MECHANISM FOR FEEDERS CONNECTED IN A GANG

Original Filed April 29, 1918 5 Sheets-Sheet 1

INVENTOR.
EMIL R. DRAVER.
BY HIS ATTORNEY
James F. Williamson

March 18, 1924. Re. 15,797

E. R. DRAVER

TRANSMISSION MECHANISM FOR FEEDERS CONNECTED IN A GANG

Original Filed April 29, 1918 5 Sheets-Sheet 2

INVENTOR,
EMIL R. DRAVER
BY HIS ATTORNEY
James F. Williamson

March 18, 1924.
Re. 15,797
E. R. DRAVER
TRANSMISSION MECHANISM FOR FEEDERS CONNECTED IN A GANG
Original Filed April 29, 1918 5 Sheets-Sheet 3
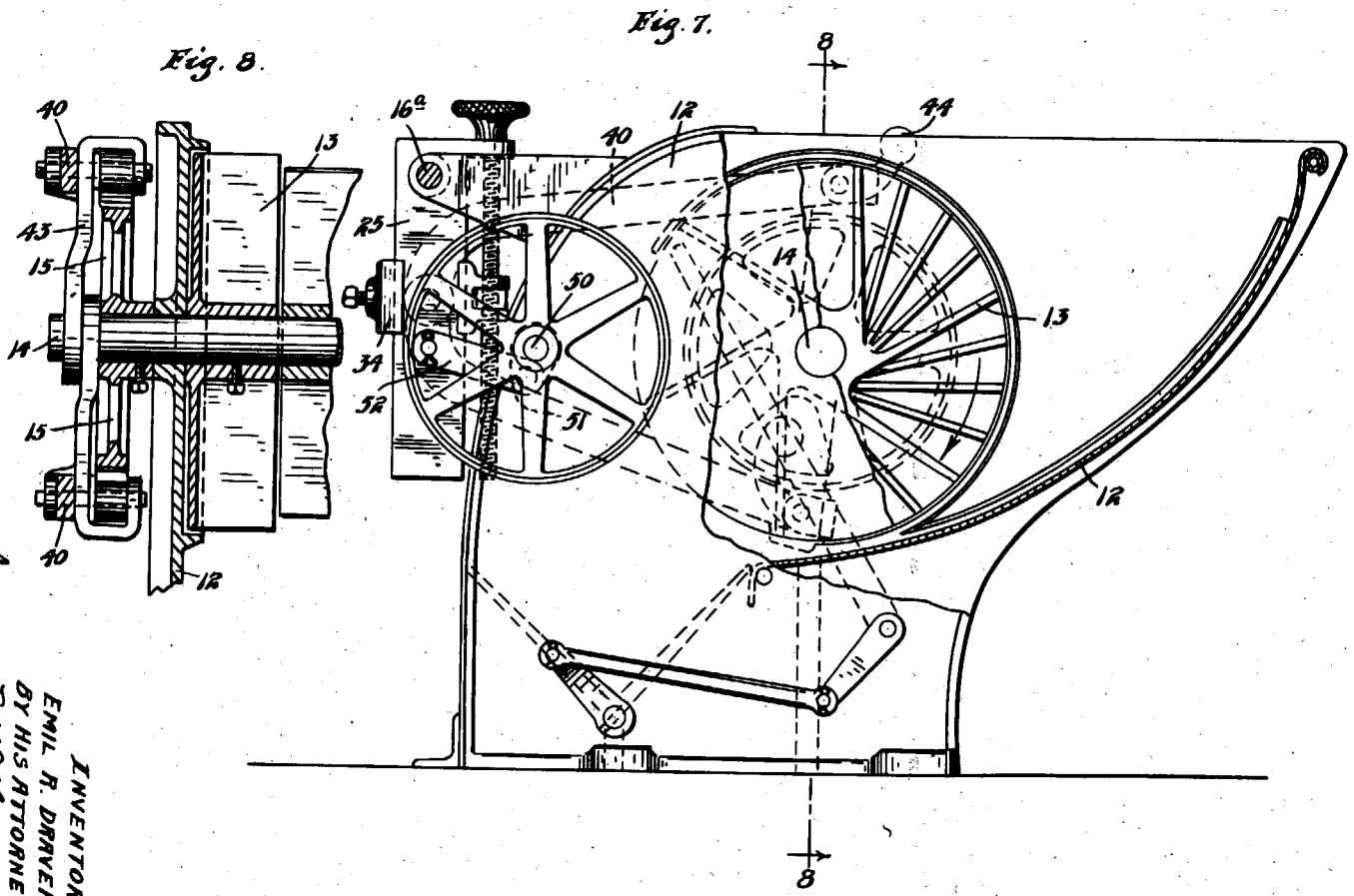
INVENTOR.
EMIL R. DRAVER.
BY HIS ATTORNEY.
James F. Williamson March 18, 1924. Re. 15,797

E. R. DRAVER

TRANSMISSION MECHANISM FOR FEEDERS CONNECTED IN A GANG

Original Filed April 29, 1918 5 Sheets-Sheet 4

INVENTOR.
EMIL R. DRAVER.
BY HIS ATTORNEY.
James F. Williamson

March 18, 1924. Re. 15,797

E. R. DRAVER

TRANSMISSION MECHANISM FOR FEEDERS CONNECTED IN A GANG

Original Filed April 29, 1918 5 Sheets-Sheet 5

INVENTOR.
EMIL R. DRAVER.
BY HIS ATTORNEY.
James F. Williamson

Reissued Mar. 18, 1924. Re. 15,797

UNITED STATES PATENT OFFICE.

EMIL R. DRAVER, OF RICHMOND, INDIANA.

TRANSMISSION MECHANISM FOR FEEDERS CONNECTED IN A GANG.

Original No. 1,296,637, dated March 11, 1919, Serial No. 231,320, filed April 29, 1918. Application for reissue filed January 31, 1921. Serial No. 441,439.

*To all whom it may concern:*

Be it known that I, EMIL R. DRAVER, a citizen of the United States, residing at Richmond, in the county of Wayne and State of Indiana, have invented certain new and useful Improvements in Transmission Mechanism for Feeders Connected in a Gang; and I do hereby declare the following to be a full, clear, and exact description of the invention, such as will enable others skilled in the art to which it appertains to make and use the same.

Broadly, my invention has for its object to provide an improved driving mechanism for a plurality of machines located in a battery or in a series, and where it is desired that the several machines be driven from a common source, such as a rock shaft, and the said machines be capable also of being thrown into and out of action, the one independently of the other. In designing this improved driving mechanism, I have particularly had in mind the requirements where a battery or series of percentage feeders, such as those known on the market as "The Draver feed and grain blending feeders" are to be operated from a common rock shaft.

Generally stated, the invention consists of the novel devices and combinations of devices hereinafter described and defined in the claims.

So far as this invention is concerned, the feed mechanism proper, of the several machines may take various forms, and the drawings of this application illustrate several of such forms. In all instances illustrated, the driving mechanism from the common operating shaft to the several machines is such that any one of the several machines may be thrown into and out of action, at will, independent of the others, and each such machine may be independently adjusted as to speed or extent of work performed.

Referring to the drawings:

Fig. 7 is a view partly in side elevation and partly in vertical section showing the same form of feeder illustrated in Figs. 1 and 2, but illustrating a slight modification and arrangement of the rock shaft;

Fig. 8 is a section on the line 8—8 of Fig. 7, some parts being broken away;

Attention is first directed to the construction illustrated in Figs. 1 to 4, inclusive, and in the description of which construction reference will also be made to Figs. 7 and 8 for some of the feeders.

Figure 2:
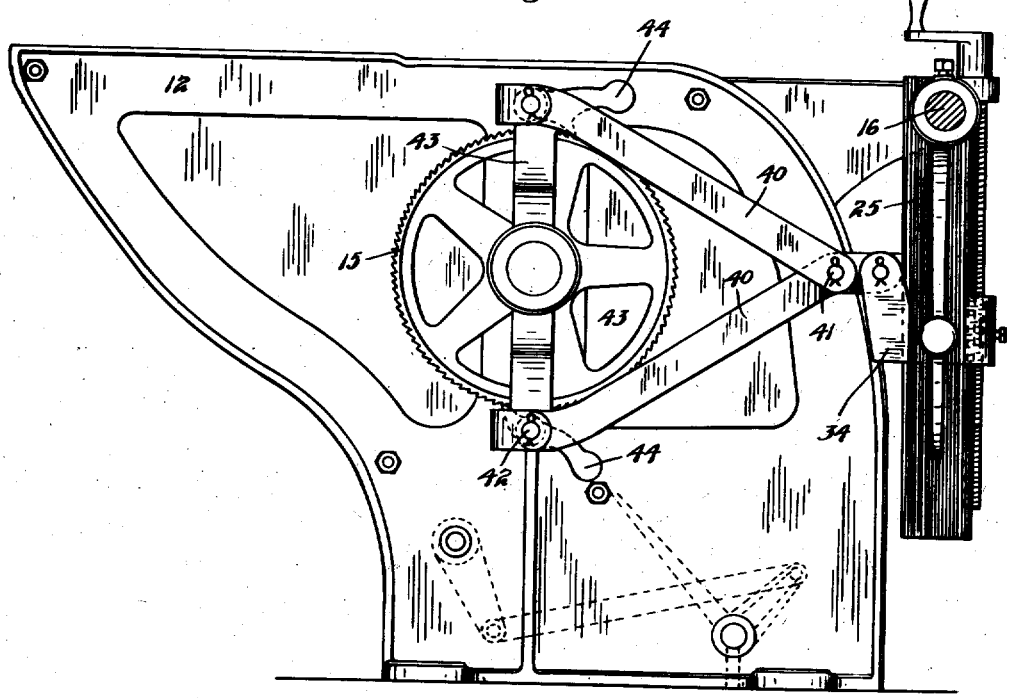
Fig. 2 is a side elevation of one of the feeders shown in Fig. 1.

Each of the so-called feeders, as shown, comprises a casing 12 through which either grain or other stock is arranged to be fed under the action of a rotary paddle wheel 13 (see Figs. 7 and 8) and the shaft 14 of which is journaled in the sides of the casing, and at one projecting end is provided with a ratchet wheel 15 (see particularly Fig. 2).

For the purpose of this case it is only necessary to state that the feed of the stock through the feeder is determined by the amount of rotary movement per unit of time that is imparted to the so-called paddle wheel 13, and that said paddle wheel, therefore, constitutes the movable element of an adjustable or variable feed mechanism.

Figure 1:
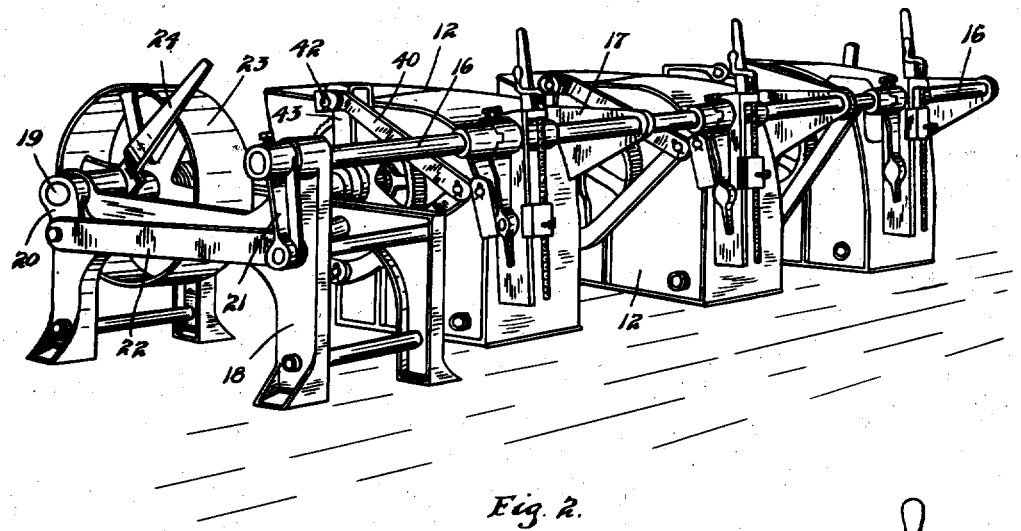
Fig. 1 is a perspective view showing a battery of feeders connected up and driven in accordance with my invention.

The several feeders of which, as shown in Fig. 1, there are three, are located side by side in arrangement of a battery and are all arranged to be driven from a common rock shaft 16. This shaft, as shown in Figs. 1 to 4, inclusive, is journaled in bearing arms 17 projecting from the respective casing 12. Also, as shown in Figs. 1 and 2, the shaft 16 is oscillated by a power transmitting device that is directed from the several casings and is made up of a framework 18, counter shaft 19, a crank 20, a crank arm 21, and a connecting link 22. This counter shaft 19 is journaled in the frame 18 and carries the crank 20. The crank arms 21 are secured to that end of the shaft 16 that is also journaled in the frame 18, and the link 22 connects the rotary crank 20 to the oscillating crank arms 21. On the shaft 19 is a pulley 23 over which a power driven belt, not shown, may run to impart oscillatory movement to the rock shaft 16 through the connections just described. The pulley 23 can be rigid on the shaft 19 or it can be loose and arranged to be connected by any suitable form of clutch operated, for instance, by a lever 24 pivoted on the shaft 19. The clutch mechanism just referred to may be of substantially the same character as that illustrated in Fig. 3 and hereinafter described as applied in another place on the mechanism.

Figure 3:
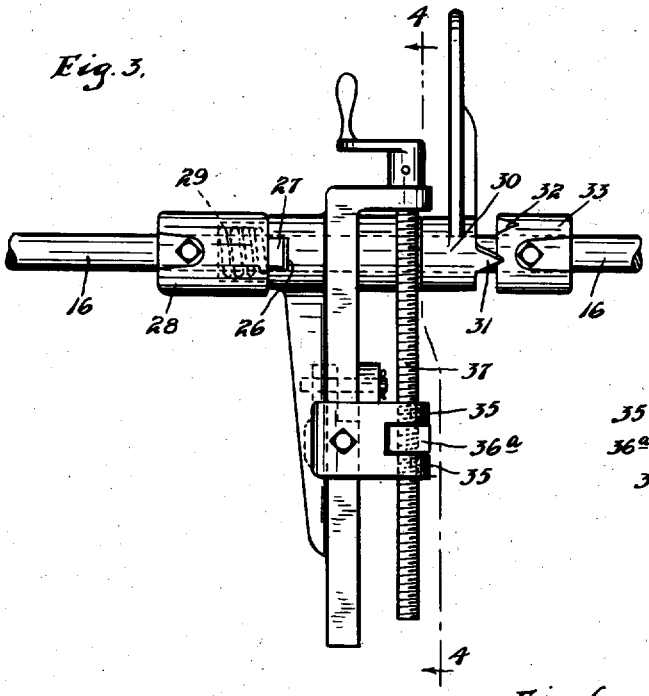
Fig. 3 is a detail in front elevation showing a portion of the common rock shaft showing one of the feeder actuating arms and certain co-operating devices.
Figure 4:
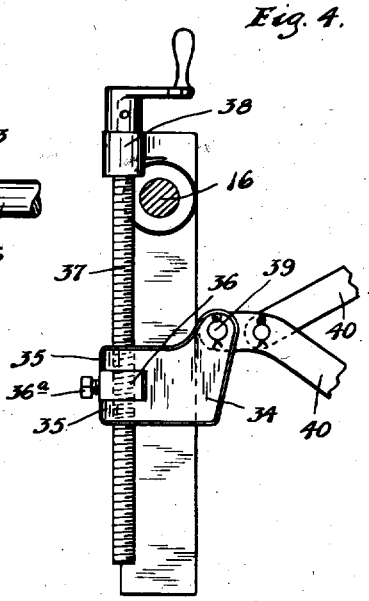
Fig. 4 is a section on the line 4—4 of Fig. 3.

The common rock shaft 16 for each feeder, is provided with a variable length crank arm 25, the preferred construction of which is best shown in detail in Figs. 3 and 4.

Primarily, the hub of the arms 25 is loose on the shaft 16 and the said hub is formed with a half clutch or notched end 26 that is engageable with a half clutch 27 shown as in the form of a lug on the end of a sleeve 28 that is rigidly secured to the shaft 16. This sleeve 28 is recessed to receive a coiled spring 29 that surrounds the shaft and exerts a force which tends to move the arm 25 laterally into a position in which its half clutch 26 will be disengaged from the half clutch 27, and hence loose on the said shaft. When the arm 25 is to be rendered operative, it will be coupled to the shaft 16 by a forced engagement of the half clutches 26 and 27; and this, as shown, is accomplished by a shifting lever 30, the hub of which is pivoted on the shaft 16 and is provided with a V-shaped lug 31 that is engageable at will, either with the end surface or with a V-shaped notch 32 of an adjacent collar 33 that is rigid on said shaft 16. When the lever 30 is adjusted, as shown in Fig. 3, its lug 31 will be out of engagement with the notch 32 and in engagement with the end surface of the abutment collar 33, and acting against the hub of the arm 25, will hold the clutch elements 26 and 27 engaged, so that the arm 25 must oscillate with the shaft 16.

Mounted to slide on the arm 25 is a crank arm head 34 that has spaced lugs 35, and between the lugs, a nut 36. The adjusting screw 37 which is swiveled to a lug 38 on the upper end of the arm 25, works with threaded engagement through the lugs 35 and the nut 36. By rotation of the adjusting screw 37, the crank head 34 may be moved toward and from the axis of the shaft 16 to vary the operative length of the crank arm. The nut 36 is shown as provided with a set screw 36[a] by which it may be locked on the screw 37 to hold the crank securely in any set adjustment.

The crank head 34 is connected by a pivot pin 39 to one of a pair of links 40, which links are shown as pivotally connected by a pin 41 at their overlapped ends, and at their extended ends, are connected by pivot pins 42 to the outer ends of a pair of driving arms 43, which latter are pivoted on the noted shaft 14. At their outer ends, the arms 43 are provided with reversely operative driving dogs 44 that operate on the ratchet wheel 15 in alternate order, or under opposing oscillatory movement of the driving arm 25, so that the feed wheel or paddle wheel 13 will be given an approximately continuous rotary movement in a constant direction, to wit, in the direction of the arrow marked on Fig. 7, under oscillatory movements of the rock shaft 16.

With the connections described, it is obvious that without interrupting or stopping the constant or unchanged oscillatory movement of the common rock shaft 16, it is possible by manipulation of the respective levers 30, to throw any one of the several feeders into or out of action, at will. Also, it is evident that by independent adjustments of the crank arm heads 34 of the respective crank arms 25, the operative radial length, and hence, the operative oscillatory throw of the several crank arms may be varied, at will, so as to independently vary the speed of rotation of the feed wheel or movable feed element of the one feeder without in anywise affecting the operation of the other.

To sum up, it is an easy matter with the connections described to independently vary the actions of the several feed devices either by throwing the same into or entirely out of action, or to vary the speed or rate of feed action thereof.

The means above described is only one of several different ways of accomplishing the general results stated.

Figure 5:
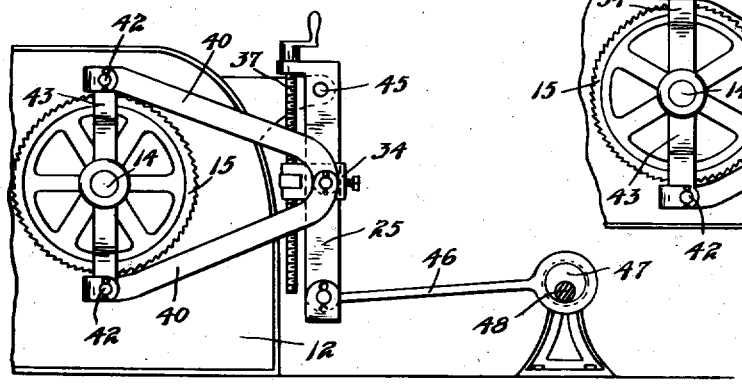

Directing attention now to Fig. 5, the construction of the feeder and the connections between the oscillatory arm 25 and the movable element of the feed mechanism, to wit, the shaft 14 and its feed wheel, is the same as that above described, except that the continuous rock shaft need not be included, but independent pivotal connections 45 may be made between the several arms 25 and the respective casings 12. In this arrangement, the several oscillatory arms 25 will be connected by links 46 to eccentrics 47 on a common rotary power driven shaft 48.

Figure 6:
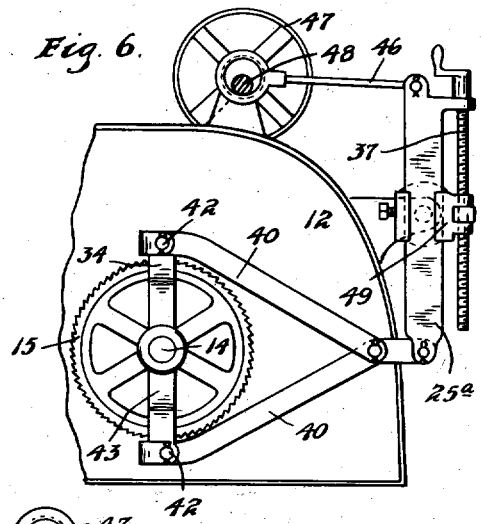
Figs. 5 and 6 are views in side elevation illustrating modified forms of the driving connection between the rock shaft and feeder.

The construction illustrated in Fig. 6 is like that described in Fig. 5, except that the oscillatory arm 25[a] is intermediately mounted for endwise adjustments through head 49 pivoted to lugs on the casing 12, and except that the shaft 48 is shown as journaled in suitable bearings on the tops of the casing 12.

The construction illustrated in Figs. 7 and 8 has already been described in part in connection with the common features here illustrated and included also in Figs. 1, 2, 3 and 4. In this construction, a power driven shaft 50 is extended through and journaled in the sides of the several casings, and is provided with crank arms 51 connected by links 52 to the respective arms 25. In this construction also, the pivotal connection between the arms 25 and the lugs on the respective casings 12 need not be a continuous shaft but may be simply stub shafts or trunnions 16[a].

Figure 9:
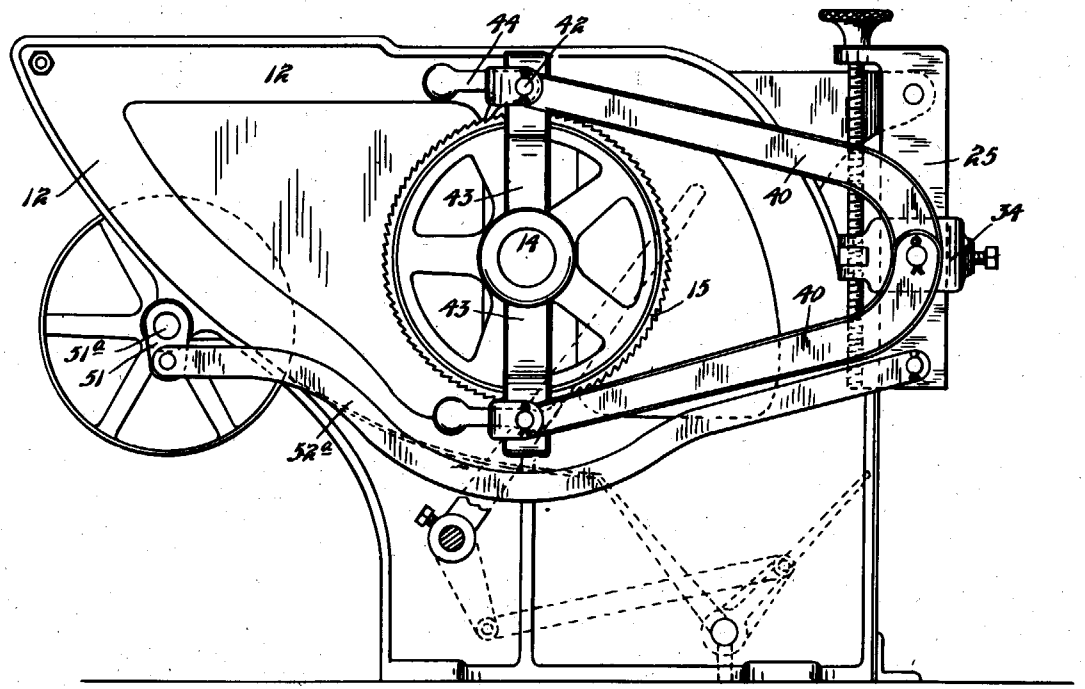
Fig. 9 is a view corresponding to Fig. 2 but illustrating a somewhat modified form of driving connection.

In the arrangement illustrated in Fig. 9, the construction is the same as that illustrated in Figs. 7 and 8, except that the shaft 51[a], which is substituted for the shaft 50, is mounted in bearings on the under back portion of the casing 12 and its crank 51[a] is connected by a long link 52[a] to the free end of the arm 25.

Figure 10:
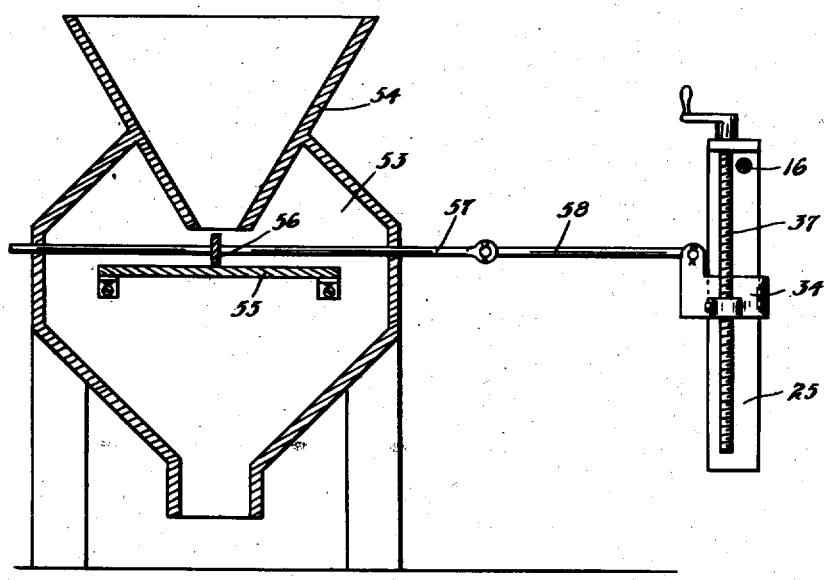
Figs. 10 and 11 are vertical sections showing slightly different constructions and illustrating the fact that the improved driving mechanism may be applied to feeders employing reciprocating rather than rotary feed devices.
Figure 11:
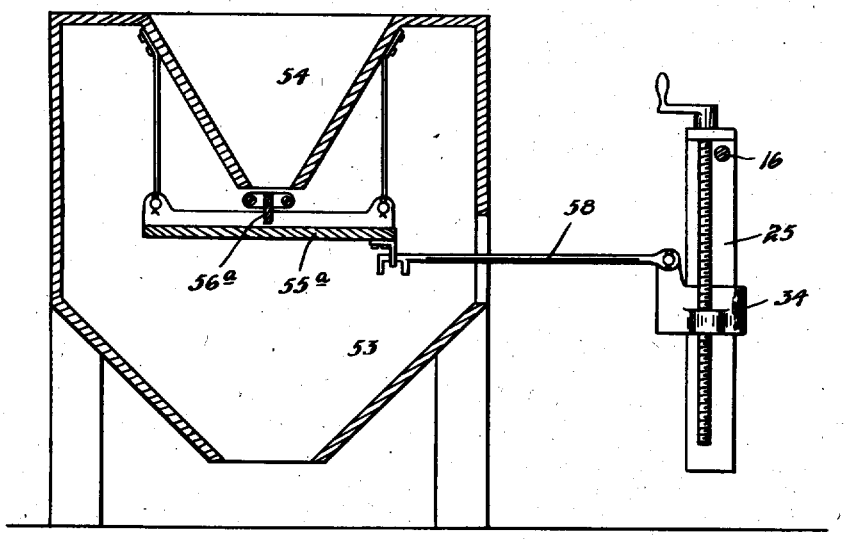

In the construction illustrated in Figs. 10 and 11, the adjustable crank arms 25, 34 and means for oscillating the common rock shaft 16 may be assumed to be the same as that illustrated in Figs. 1 and 2. In the construction illustrated in Fig. 1, the numeral 53 is a casing provided with a supply hopper 54, and below the said hopper, a fixed shelf 55, and the discharge from the hopper 54 onto and off from the shelf 55 is produced by a blade 56 secured to a reciprocating rod 57 through the sides of the casing and connected by a link 58 to the crank arm head 34.

In the construction illustrated in Fig. 11, the shelf 55[a] is hung for vibratory movements and the blade 56[a] is fixed; and the movable shelf 55[a] is connected by a link 58[a] to the crank arm head 34.

The several modifications illustrated make clear that the broad idea of my invention may be incorporated in various different types of machines, and it is, of course, understood that such modifications may be extended beyond the illustrations given.

It is highly important to note that the power driven common shaft which, in the particular machine illustrated, is the rock shaft 16, is mounted in bearings on the several machines of the gang. This insures proper alinement and proper connection of the several machines and, in fact, connects the machines not only in a gang but in a self-contained gang whereby only the machines that make up the gang are used for bearings or supports in the various parts of the complete mechanism. In this arrangement, motion is transmitted to the several machines of the gang through the common power driven shaft, but the several machines may be independently thrown into and out of action and may be simultaneously driven at various different speeds. This is highly important especially when the machines are in the nature of feeders, which co-operate to feed various different but definite percentages or proportions of material which are to be mixed to form blends or composite materials, such for example, as stock foods, poultry feed, and the like.

What is claimed is:

1. A self-contained gang of machines having a common power-driven shaft mounted in suitable bearings thereon, a variable stroke ratchet mechanism on each machine, a variable stroke connection between each ratchet mechanism and said common shaft, and means for throwing said variable stroke connections, independently into and out of action at will.

2. The combination with a self-contained gang of machines, of a common power-driven shaft mounted on the several machines, variable stroke ratchet mechanisms for independently transmitting motion to the respective machines, variable stroke crank arms for variably and independently operating the respective ratchet mechanisms, and means including clutches for operatively connecting said crank arms with said common shaft, independently and at will.

3. The combination with a self-contained gang of machines, of a common power-driven shaft mounted on the several machines, variable stroke ratchet mechanism for independently transmitting motion to the respective machines, oscillatory variable stroke crank arms for variably and independently operating the respective ratchet mechanisms, and means including clutches for operatively connecting said crank arms with said common shaft independently and at will.

4. The combination with a self-contained gang of machines, of a common power-driven rock shaft mounted on the several machines, means for oscillating said rock shaft, variable stroke ratchet mechanisms for transmitting motion to the respective machines, variable stroke oscillatory crank arms primarily loose on said rock shaft, connections between said crank arms and the respective ratchet mechanisms, and clutches for operatively connecting said respective crank arms to said common rock shaft, independently and at will.

5. In a self-contained gang of machines having a common power-driven shaft mounted in suitable bearings thereon, a variable stroke ratchet mechanism on each machine, an operating connection between said shaft and said ratchet mechanism, means for independently adjusting the said ratchet mechanism, and means for independently throwing into and out of action the ratchet adjusting mechanism.

6. An apparatus of the class described having in combination, a feeder unit comprising a flow controlling means, a driving shaft, a rocking structure comprising a shaft rigid on the remainder of said rocking structure, means for connecting said driving shaft and said last mentioned shaft, and transmission means connecting the flow controlling means and said rocking structure, the connection between the transmission means and said rocking structure being adjustable on said rocking structure toward and from the axis of the rocking structure.

7. An apparatus of the class described, having in combination, a plurality of feeder units, each comprising flow controlling means, a driving means for said feeders including a rock shaft extending to all of said feeders, a rocking structure for each feeder connected to said rock shaft and said flow controlling means, said connection between said rocking structure and said flow controlling means being adjustable toward and from the axis of said rock shaft.

8. An apparatus for proportionately feeding different fine or granular materials comprising, a battery of feeding devices, each constituting a separate machine unit having a rotatable feeding mechanism, a single rotatable driving mechanism, an oscillating means driven by said rotatable driving mechanism extending to all of said feeding devices, and an independently variable means connecting said oscillating means with each of said rotatable feeding mechanisms for rotating the latter.

9. An apparatus for proportionately feeding different fine or granular materials having in combination, a battery of feeding devices, each constituting a separate machine unit having a feeding mechanism, a single rotatable driving mechanism, a rock shaft driven by said rotatable driving mechanism extending to all of said feeding devices and forming the sole driving means therefor, and the sole operating connection therebetween, and an independently adjustable means connecting said rock shaft with each of said feeding mechanism for operating the latter.

10. An apparatus for proportionately feeding different fine or granular materials comprising, a battery of feeding devices, each constituting a separate machine unit having a rotatable feeding mechanism, a driven rock shaft extending to all of said feeding devices, independently variable means connecting said rock shaft with each of said rotatable feeding mechanisms, and means for throwing said rock shaft into and out of operation at will.

11. An apparatus for proportionately feeding different fine or granular material comprising, a plurality of feeding devices, each constituting a separate machine unit, a single driven rock shaft extending to all of said units, independently adjustable means for operating each of said feeding devices from said rock shaft connectible to and disconnectible from said rock shaft at will, and means for driving said rock shaft connectible to and disconnectible from said rock shaft at will.

In testimony whereof I affix my signature.

EMIL R. DRAVER.